United States Patent Office 2,868,828
Patented Jan. 13, 1959

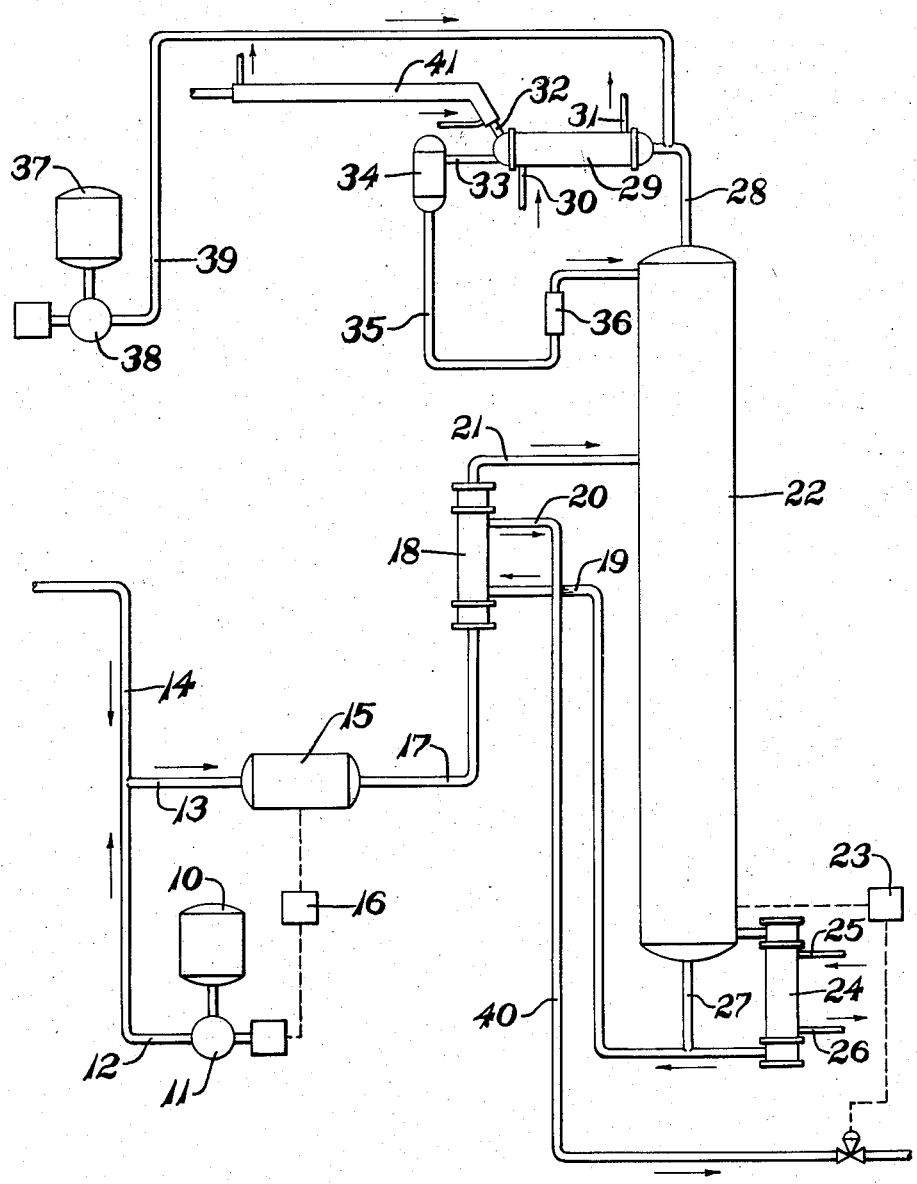
INVENTORS
RICHARD H. GILL
HAROLD H. RADKE
CARL H. KOTHEIMER
BY
ATTY.

2,868,828

METHOD OF REMOVING LACTONITRILE FROM AQUEOUS MIXTURES

Richard H. Gill, Calvert City, Ky., and Harold H. Radke and Carl H. Kotheimer, Bay Village, Ohio, assignors to The B. F. Goodrich Company, New York, N. Y., a corporation of New York Application November 19, 1956, Serial No. 623,115

9 Claims. (Cl. 260—465.6)

This invention relates to a method of removing lactonitrile from aqueous media and more particularly pertains to a method of stripping lactonitrile from aqueous media by decomposing the lactonitrile to HCN and acetaldehyde under neutral or alkaline conditions and at elevated temperatures, removing the products of decomposition substantially as fast as they are formed and passing the HCN and acetaldehyde into an acidic aqueous medium to retard recombination of the HCN and acetaldehyde to lactonitrile.

In the production of acrylonitrile small amounts of lactonitrile are formed. Complete removal of lactonitrile is essential to produce an acrylonitrile having uniform polymerization characteristics, because of the known tendency of lactonitrile to act as a polymerization inhibitor.

Lactonitrile is soluble in water, so that it can be removed from the crude acrylonitrile by aqueous scrubbing and then fractionating the aqueous mixture to separate and recover the acrylonitrile. The concentration of lactonitrile present in the aqueous medium will depend in some degree on the amount present in the crude acrylonitrile, on the effectiveness of the washing step, which in turn will depend on the relative volume of water employed to remove the lactonitrile and on the procedure used for washing.

An object of this invention is the provision of a method for removing lactonitrile from aqueous solutions by decomposing the lactonitrile to acetaldehyde and HCN under neutral or slightly alkaline conditions and at an elevated temperature and preventing recombination of the decomposition products by absorbing them in an acidic medium.

Another object is the provision of a method for removing lactonitrile from aqueous solution by decomposing the nitrile to acetaldehyde and HCN at a pH from about 7 to about 11 and vaporizing the acetaldehyde and HCN into an aqueous medium having a pH of about 3.2 or lower to prevent recombination of the components to lactonitrile.

Other objects will be apparent from the following detailed disclosure which describes a preferred embodiment of the invention.

The above objects are accomplished by adjusting the pH of a lactonitrile solution to a range of from about 7 to about 11 or slightly above, to convert the lactonitrile to

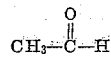

and HCN at an elevated temperature. The acetaldehyde and HCN vaporize and distill from the alkaline aqueous medium and pass into an acidic aqueous zone in which the pH is about 3.1 to 3.2 or lower. Under the acidic conditions the rate of recombination of acetaldehyde and HCN to lactonitrile is retarded very markedly. The acetaldehyde and HCN remain dissolved in the acidic medium and can be returned to the acrylonitrile process or treated for other means of disposition.

Referring to the drawing, a description of the invention directed to removal of lactonitrile from wash water in an acrylonitrile purification process is given, although it is understood that the process is applicable to aqueous lactonitrile solutions from any other source.

An aqueous alkaline solution from storage tank 10 is fed, by means of pump 11, into a line 12, which is connected to line 13. A dilute lactonitrile solution is fed through line 14 into line 13, and passed into a mixing tank 15, which has a pH controller 16 connected thereto in order to keep the lactonitrile-aqueous alkali mixture at a pH above 7, and preferably between about 7 and 11. The pH controller can be any type, but it is preferred to have one which will cause actuation of the pump 11 to add more alkali to the lactonitrile feed when the pH is below 7 and which will cause slowing down of the pump when the pH is above 11. The alkaline lactonitrile is then passed through pipe 17 into heat exchanger 18. A heat exchange medium which can be the spent liquid from the lactonitrile stripping column is circulated through the heat exchanger by entering through pipe 19 and leaving the heat exchanger through pipe 20, as will be explained in greater detail hereinafter. The alkaline lactonitrile mixture passes from heat exchanger 18 through line 21 into a lactonitrile decomposing column 22 where it flows by gravity down to the bottom of the column. The column is heated by means of a steam injection or other known means to maintain the temperature at about 190° F. or higher and preferably above the boiling point of the liquid. A liquid level control 23 is connected to the lactonitrile decomposing column to maintain a proper level of liquid in the column at all times. From column 22 the liquid can be passed into a reboiler 24 which is a jacketed heat exchange unit that can be heated with a circulating fluid such as steam through entry line 25 and exit line 26. Pipe 27 is a thermal cycle of the reboiler. The vapors from the lactonitrile decomposing column pass upwardly to line 28 into condenser 29. The condenser is so arranged that it contains both liquid and vapor outlets. Cooling of the gases entering the condenser is effected by circulating water through lines 30 and 31. Vapors which are still present in the condenser and which consist essentially of steam, acetaldehyde and HCN vapors are removed in part through line 32 from which they pass into a jacketed line 41 where they may be heated to prevent condensation and passed to a collecting station. The condensate is withdrawn through line 33 which is connected to a separator 34. Line 35 connected to the bottom of separator 34 is a reflux line which is connected to the lactonitrile decomposing column through rotometer 36 which is used to control the reflux ratio during the lactonitrile decomposing process. An acid medium, usually an aqueous acid, from storage tank 37 is passed through pump 38 into line 39 which is connected to line 28. Thus, the liquid acid solution is blended with the vapors from the lactonitrile decomposing column just prior to entry of the mixture into condenser 29. The amount of acid is regulated so as to maintain a pH of 3.2 or less and preferably about 2 to 2.5 in the reflux liquid. As mentioned heretofore the spent liquid from the lactonitrile decomposing column can be circulated either through reboiler 24 or removed from the column through line 27. The temperature of the liquid at this stage of the process is fairly high and therefore it can be employed for heating the entering lactonitrile solution by circulating it through heat exchanger 18. After circulation through the heat exchanger the spent liquid which contains only very small traces of total cyanide is passed through line 40 to a waste treatment apparatus and thereafter disposed by the usual process of draining into a sewer or passing into a stream.

Example I

Water containing 2.42% by weight of lactonitrile was fed continuously into the stripping column at a temperature of 189–201° F. Sufficient 20% by weight aqueous sodium hydroxide solution was continuously added to the lactonitrile solution to maintain the pH in a range of from 8.9 to 10.3. The temperature of the liquid in the bottom of the column was kept in a range of from 216–235° F. by injecting steam into the column and keeping it under a pressure of from about 7 to about 9.5 pounds per square inch. Under the alkaline conditions the lactonitrile was converted to acetaldehyde and HCN which vaporized readily at the operating temperature. The vapors were passed through the top of the column and mixed with sufficient 75% by weight aqueous solution of phosphoric acid to maintain the pH at about 2.5 in the reflux line of the apparatus. The pH at the bottom of the column ranged from about 7.3 to about 10.2 during the run. Analysis of samples from the bottom of the reactor showed that the liquid contained less than 11 p. p. m. total cyanide. The free cyanide in the reflux of the column was 2.75%.

Example II

An aqueous mixture obtained after washing crude acrylonitrile was passed through the lactonitrile stripping apparatus continuously over a period of 8 hours. The feed liquid entering the column contained from about .068 to .095% lactonitrile by weight. The mixture was fed into the stripping column at a rate of about 30 gallons per minute. A 20% solution of sodium hydroxide was continuously blended with the lactonitrile feed to maintain a pH of 9–10. The column was operated under 6–10 pounds' pressure. The aqueous liquid at the bottom of the column was held at a pH of 8–9. Some material was continuously withdrawn from the bottom of the column through the overflow.

The temperature at the reflux condenser was held at about 200° F. The temperature at the top of the column was about 220° F. and the temperature of the liquid at the exit end of the condenser was 200° F. A 75% solution of phosphoric acid was fed into the condenser to keep a pH of 2–3 in the reflux liquid. During the entire period of operation vapors in the reflux condenser were vented and removed from the system. The lactonitrile was very effectively removed from the water, as shown by analyses of the column bottoms which contained from 8 to 14 p. p. m. total cyanide calculated as HCN.

Example III

An aqueous mixture obtained after washing acrylonitrile and stripping the acrylonitrile therefrom was fed into a lactonitrile stripping column at a pH of 9.6–10.2 and a temperature of 190–194° F. The temperature at the bottom of the column was maintained at a temperature of about 216–217° F. by steam injection. The pH of the liquid in the bottom of the column was maintained at about 10.1–10.2. The vapors entering the condenser had a temperature of 211–212° F. and the vapors leaving the condenser had a temperature of 98–104° F. Aqueous phosphoric acid was allowed to enter the condenser in a quantity sufficient to maintain the pH of the liquid in the reflux at a value of 2.6 to 3.1. The total cyanide in the feed varied between .200 and .208% of which .027 to .035% was free HCN. When the pH of the reflux liquid was 3.1 it contained 7.4% total HCN and 1.62% free HCN. The effluent leaving the bottom of the column contained 27 p. p. m. total cyanide. When the pH of the reflux was adjusted to 2.6 the total cyanide was 10.5% of which 5.64% was free HCN and the total cyanide content of the effluent leaving the bottom of the column was 16 p. p. m. This example shows that if the reflux liquid has a pH of 3.1 there is much greater tendency for recombination of HCN and acetaldehyde than at a pH of 2.6 when a much higher proportion of the HCN remains uncombined.

Example IV

An aqueous mixture obtained from washing crude acrylonitrile contained .184% lactonitrile. The pH of the mixture was made slightly alkaline, pH 9.7, with 20% aqueous sodium hydroxide and fed into the column at a temperature of about 217° F. The temperature in the bottom of the column was maintained at about 254° F. The vapors entered the condenser at about 206° F. and left the condenser at about 134° F. A solution of phosphoric acid was fed into the condenser in such amounts that the pH of the reflux liquid leaving the condenser was about 2.1. Under these operating conditions the liquid in the bottom of the column contained only about 8 p. p. m. total cyanide calculated as HCN, and the pH was about 7.9. The reflux liquid contained 17.3% total cyanide calculated as HCN and 16.98 of the cyanide was free HCN. Analysis also showed that the reflux liquid contained 18.2% acetaldehyde.

When an aqueous mixture obtained from washing crude acrylonitrile and containing 0.20% total HCN was fed into the column at a pH of 9.8, and temperature 198° F. and heated to 229° F. in the column, but maintaining the reflux mixture at a pH of 6, only 1.62% total HCN was present in the reflux liquid, and only .092% was free HCN.

Example V

A synthetic mixture of water and lactonitrile containing from 1.25 to 1.63% total HCN was fed into a column at a pH of from 7.0 to 8.7. The column was heated to about 230° F. with steam under pressure. The HCN and acetaldehyde were vented and removed from the column without absorption in an acidic mixture. Under these circumstances the HCN in the bottom of the column averaged about 49 p. p. m.

Further tests showing the importance of an aqueous acidic medium in the exit zone of the column become apparent from the following comparisons. An aqueous mixture obtained from washing crude acrylonitrile was treated by the procedure above. The lactonitrile content of the mixture entering the column was .621 mole percent. The vapors in the exit portion of the condenser contained 5.68 mole percent of free HCN and a total cyanide content of 5.92 mole percent. When aqueous $H_3PO_4$ was introduced into the vapors just before entry into the condenser, and an aqueous mixture containing .65 mole percent of lactonitrile was fed into the column and treated as above, the vapors leaving the condenser analyzed 21.33 mole percent free HCN and 21.58 mole percent total cyanide.

Although we have described our invention by specific examples in which sodium hydroxide was employed for adjusting the pH of the crude, wash water containing lactonitrile it is apparent that any alkali metal hydroxide, carbonate or bicarbonate or alkaline earth metal hydroxide, carbonate or bicarbonate which will provide a pH of 7 to 11 in the aqueous system can be substituted for sodium hydroxide.

In place of phosphoric acid other acids which are stable at operating temperatures and which will not react with the acetaldehyde or HCN can be employed. Included among these acids are the usual mineral acids such as sulfuric, nitric, hydrochloric and the strong organic acids such as trichloroacetic, acetic, fluoroacetic, etc. In place of the liquid acids it is also possible to use acid gases such as $SO_2$ or nitrogen oxides which form acidic solutions in water provided that a pH below 3.2 is obtained. The pH, however, can be as low as 1 or lower, but there is little advantage in decreasing the pH range below about 2.

The temperature range which is operable is quite varied but it should be well above the boiling point of HCN and acetaldehyde, so that each component can be rapidly removed from the alkaline medium, preferably substantially as fast as it is formed. In this way the vapors in the column will consist of a high proportion of HCN, acetaldehyde and steam. Accordingly, it is desired that the temperature be above 100° F. and can be as high as about 300° F. or slightly higher. The preferred temperature range is from about 190° F. to about 250° F.

It is preferred not to condense all of the vapors which pass from the column for the reason that it is possible to remove a portion of the acetaldehyde and HCN in their vapor states and to liquefy the remainder of the vapors entering the condenser. The condensate then can be employed as a reflux liquid. In this manner the pH of the condensate can be determined and controlled.

The pressure under which the operation is effected can vary quite widely since the process can be carried out under vacuum, at atmospheric pressure or at superimposed pressure. Thus, when the operation is carried out at a temperature of about 250° from the bottom of the column the top of the column will have a superimposed pressure of from about 7 to 10 pounds per square inch depending upon the rate of withdrawal of vapors from the top of the column. It is, of course, possible to operate at considerably higher pressure but there is no advantage in such procedure.

Although we have described our invention by reference to specific examples, we believe it apparent that there are numerous modifications possible with respect to the manipulative steps and that therefore the examples should not be considered as limitations on the invention but rather as merely descriptive of it.

We claim:

1. A method for removing lactonitrile from aqueous media comprising decomposing lactonitrile to HCN and acetaldehyde under alkaline conditions at a temperature of from about 100 to about 300° F., removing the lactonitrile decomposition products substantially as rapidly as they are formed and passing vapors of the decomposition products into an aqueous acid medium having a pH below about 3.2 to retard the recombination of the acetaldehyde and HCN.

2. The method of claim 1 in which the pH of the lactonitrile mixture prior to decomposition is from about 7 to 11.

3. The method of claim 1 in which the pH of the acetaldehyde, HCN and aqueous acid mixture is below about 2.5.

4. The method of claim 1 in which the lactonitrile decomposition temperature is from about 200 to 250° F.

5. The method of claim 1 in which the acid medium is an aqueous phosphoric acid.

6. A method of stripping lactonitrile from aqueous media comprising decomposing the lactonitrile to HCN and acetaldehyde at a pH of 7 to 11 and at a temperature of from about 200 to 250° F., removing the products of decomposition substantially as fast as they are formed, passing the vapors from the decomposition into a condenser, adding an aqueous acidic medium to the vapors just prior to their entry into the condenser, condensing a portion of the vapors and withdrawing another portion of said vapors while maintaining the pH of the condensate below 3.2 and returning the condensate into the decomposing column as reflux.

7. The method of claim 6 in which phosphoric acid is employed for regulating the pH of the condensate.

8. The method of claim 6 in which sodium hydroxide solution is employed to regulate the pH of the aqueous lactonitrile containing mixture.

9. A method of stripping lactonitrile from an aqueous lactonitrile containing mixture comprising introducing said mixture into a decomposition column at a temperature of about 190 to 200° F. and at a pH of 8 to 9, maintaining a temperature of from about 220 to 230 in the decomposition zone, removing decomposition products of lactonitrile substantially as rapidly as they are formed and blending the vapors with an aqueous solution of phosphoric acid in a quantity sufficient to maintain the pH of a condensed portion of said vapors and liquid at a pH of about 2.0 to 2.5, maintaining a temperature of below about 150° F. in the condenser so as to condense only a portion of the vapors entering therein, removing the uncondensed vapors from the condenser and passing the condensate back into the decomposing zone as a reflux liquid.

References Cited in the file of this patent

UNITED STATES PATENTS

| | | |
|---|---|---|
| 2,416,624 | Hansley | Feb. 25, 1947 |
| 2,731,490 | Barsky | Jan. 17, 1956 |
| 2,733,259 | De Croes et al. | Jan. 31, 1956 |

FOREIGN PATENTS

| | | |
|---|---|---|
| 162,157 | Australia | Mar. 24, 1955 |
| 1,089,037 | France | Sept. 22, 1954 |